(12) United States Patent
Carlson et al.

(10) Patent No.: US 7,812,994 B2
(45) Date of Patent: Oct. 12, 2010

(54) HANDHELD PRINTER

(75) Inventors: Gregory F. Carlson, Corvallis, OR (US); Patrick A. McKinley, Corvallis, OR (US); Todd A. McClelland, Corvallis, OR (US); James D. Bledsoe, Albany, OR (US); Asher Simmons, Corvallis, OR (US)

(73) Assignee: Marvell International Technology Ltd. (BM)

( * ) Notice: Subject to any disclaimer, the term of this patent is extended or adjusted under 35 U.S.C. 154(b) by 1140 days.

(21) Appl. No.: 11/149,768

(22) Filed: Jun. 10, 2005

(65) Prior Publication Data

US 2006/0279784 A1    Dec. 14, 2006

(51) Int. Cl.
*B41J 3/36* (2006.01)

(52) U.S. Cl. .......................... 358/1.18; 347/40; 347/41; 347/42; 347/43; 347/109; 400/76; 400/88

(58) Field of Classification Search ................ 358/1.18; 347/109, 40–43; 400/88, 76
See application file for complete search history.

(56) References Cited

U.S. PATENT DOCUMENTS

| | | | |
|---|---|---|---|
| 3,469,422 A | 9/1969 | Minton | |
| 4,387,579 A | 6/1983 | Branke et al. | |
| 5,825,995 A | 10/1998 | Wiklof et al. | |
| 5,861,877 A * | 1/1999 | Kagayama et al. | ......... 345/179 |
| 6,030,582 A | 2/2000 | Levy | |
| 6,217,017 B1 | 4/2001 | Yamazaki | |
| 6,332,677 B1 | 12/2001 | Steinfeld et al. | |
| 6,357,939 B1 | 3/2002 | Baron | |
| 6,390,249 B2 | 5/2002 | Tachibana | |
| 6,580,244 B2 | 6/2003 | Tanaka et al. | |
| 6,682,190 B2 | 1/2004 | Rasmussen et al. | |
| 6,789,869 B2 | 9/2004 | Takeishi | |
| 6,851,878 B2 | 2/2005 | Hemmerlin | |
| 6,896,349 B2 | 5/2005 | Valero et al. | |
| 6,916,128 B1 * | 7/2005 | Petteruti et al. | ............... 400/88 |
| 6,933,889 B1 | 8/2005 | Wolf et al. | |
| 6,942,335 B2 | 9/2005 | Trent | |
| 6,951,778 B2 | 10/2005 | Akhavain et al. | |
| 6,952,284 B2 | 10/2005 | Andrews et al. | |
| 7,108,370 B2 * | 9/2006 | Breton | ....................... 347/109 |
| 7,182,456 B2 * | 2/2007 | Walling | ...................... 347/109 |

(Continued)

FOREIGN PATENT DOCUMENTS

EP    1 543 981 A3    7/2006

(Continued)

OTHER PUBLICATIONS

GB Search Report from corresponding GB application No. 0610837.7, dated Oct. 31, 2006, 2 pages.

(Continued)

*Primary Examiner*—Chan S Park

(57) ABSTRACT

A handheld printer that provides an appropriate application of ink to a print medium without a bulky and complex mechanical system for positioning a print head with respect to the print medium. A handheld printer according to the present teachings includes a navigation subsystem that tracks a motion of the handheld printer with respect to a printing surface and a print head controller that causes a print head to fire ink drops onto the printing surface in response to the motion and in response to an image contained in an image buffer.

24 Claims, 3 Drawing Sheets

U.S. PATENT DOCUMENTS

| | | | |
|---|---|---|---|
| 7,184,167 B1 * | 2/2007 | Ito et al. | 358/1.18 |
| 7,336,388 B2 * | 2/2008 | Breton | 358/1.18 |
| 2004/0252051 A1 | 12/2004 | Johnson | |
| 2007/0009277 A1 | 1/2007 | Shoen | |
| 2007/0080494 A1 | 4/2007 | Marshall et al. | |
| 2008/0211864 A1 | 9/2008 | Mealy et al. | |
| 2008/0213018 A1 | 9/2008 | Mealy et al. | |
| 2008/0215286 A1 | 9/2008 | Mealy et al. | |

FOREIGN PATENT DOCUMENTS

| | | |
|---|---|---|
| WO | WO 03/055689 A1 | 7/2003 |
| WO | WO03/076196 A1 | 9/2003 |
| WO | WO 2004/056577 A1 | 7/2004 |
| WO | WO 2005/070684 A1 | 8/2005 |

OTHER PUBLICATIONS

HP Ink Jet Printer Cartridge Anatomy, http://wandel.ca.hp45_anatomy/index.html, printed Apr. 19, 2007, pp. 1-8.

International Search Report mailed Jul. 28, 2008, for International Application No. PCT/US2008/55636.

U.S. Appl. No. 11/952,849 entitled, "Handheld Tattoo Printer", filed Dec. 7, 2007, 43 pages.

U.S. Appl. No. 12/036,862, entitled, "Print Head Configuration for Hand-Held Printing", filed Feb. 25, 2008, 32 pages.

U.S. Appl. No. 12/039,491 entitled, "Cap Design for an Inkjet Print Head With Hand-Held Imaging Element Arrangement With Integrated Cleaning Mechanism", filed Feb. 28, 2008. 38 pages.

U.S. Appl. No. 12/041,466 entitled, "Ink Supply for a Hand-Held Ink Jet Printer", filed Mar. 3, 2008, 38 pages.

U.S. Appl. No. 12/074,018 entitled, "Hand-Propelled Labeling Printer", filed Feb. 28, 2008, 47 pages.

U.S. Appl. No. 12/074,123 entitled, "Managing Project Information with a Hand-Propelled Device", filed Feb. 28, 2008, 50 pages.

U.S. Appl. No. 12/132,405 entitled, Device and Method for Dispensing White Ink, filed Jun. 3, 2008, 37 pages.

U.S. Appl. No. 12/141,717, entitled, Hand-Held Printing Device and Method for Tuning Ink Jet Color for Printing on Colored Paper, filed Jun. 18, 2008, 38 pages.

Written Opinion of the International Searching Authority mailed on Jul. 28, 2008, for International Application No. PCT/US2008/55636.

* cited by examiner

HANDHELD PRINTER

BACKGROUND

A printer may include a print head for imparting ink onto a print medium. One example of a print medium is a sheet of paper. One example of a print head is a thermal ink jet that fires ink drops onto a print medium.

A printer may render an image onto a print medium by imparting ink onto predetermined areas of the print medium. For example, an image rendered by a printer may be represented as an array of pixels. A value associated with a pixel may indicate an amount of ink to be imparted onto an area of the print medium that corresponds to the pixel.

A printer may include a mechanical system for precisely controlling a position of a print head with respect to a print medium. For example, a printer may include an arrangement of rollers, a carriage, pulleys, etc., for precisely controlling a position of an ink jet print head with respect to a sheet of paper. A precise control of a position of a print head with respect to a print medium enables the printer to impart an appropriate amount of ink onto the appropriate areas of the print medium when rendering an image.

A mechanical system for precisely controlling a position of a print head with respect to a print medium may be relatively complex and bulky. Unfortunately, a relatively complex and bulky mechanical system may increase the cost of manufacturing a printer. In addition, a relatively complex and bulky mechanical system may limit the possible form factors of a printer. For example, a bulky mechanical system may impose a lower limit on the size of a printer.

SUMMARY OF THE INVENTION

A handheld printer is disclosed that provides an appropriate application of ink to a print medium without a bulky and complex mechanical system for positioning a print head with respect to the print medium. A handheld printer according to the present teachings includes a navigation subsystem that tracks a motion of the handheld printer with respect to a printing surface and a print head controller that causes the print head to fire ink drops onto the printing surface in response to the motion.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
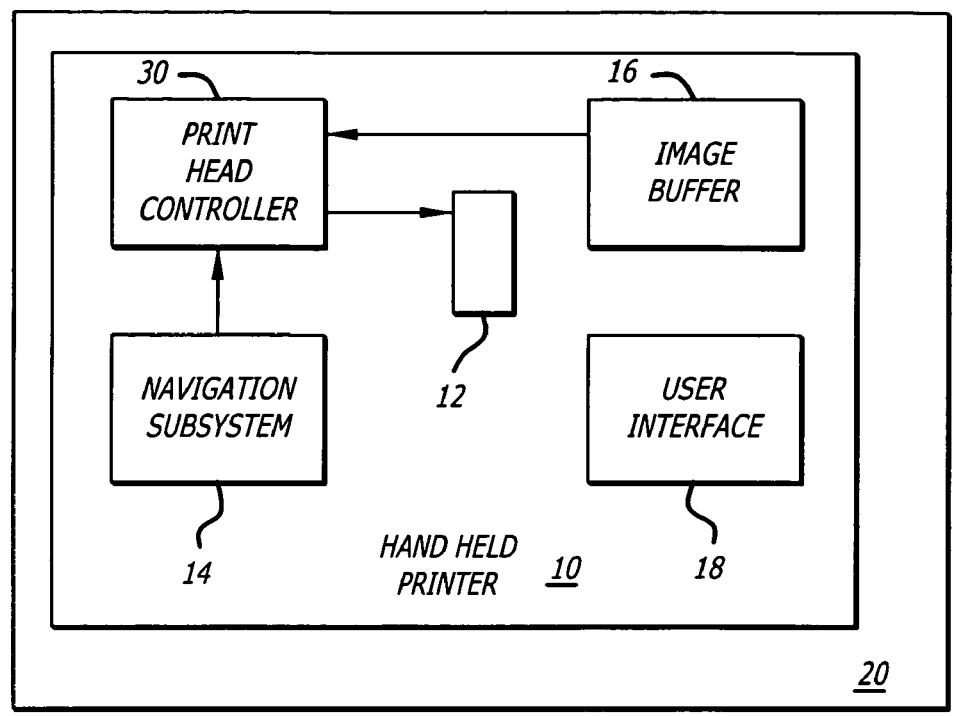
FIG. 1 shows a handheld printer according to the present teachings.

FIG. 1 shows a handheld printer 10 according to the present teachings. The handheld printer 10 includes a print head 12, a navigation subsystem 14, an image buffer 16, a user interface 18, and a print head controller 30. The handheld printer 10 is shown positioned over a printing surface 20.

The image buffer 16 holds an image to be printed onto the printing surface 20. For example, the image buffer 16 may hold a bitmap image.

The print head 12 ejects ink drops onto the printing surface 20 under control of the print head controller 30. In one embodiment, the print head 12 is a thermal ink jet print head.

A user prints onto the printing surface 20 by engaging a print operation via the user interface 18 and then moving the handheld printer 10 by hand over the printing surface 20. The navigation subsystem 14 tracks the position of the handheld printer 10 with respect to the printing surface 20 as the user moves the handheld printer 10 over the printing surface 20. The print head controller 30 causes the print head 12 to fire ink drops onto the surface 20 in response to the position of the handheld printer 10 with respect to the printing surface 20 and in response to the contents of the image buffer 16 so that an image defined in the image buffer 16 is printed onto the printing surface 20.

The user may employ any pattern of motion when moving the handheld printer 10 over the printing surface 20 during a print operation. The print head controller 30 keeps track of which portions of the image have been printed during a print operation. If the user employs a movement, e.g. an overlapping movement, that positions the handheld printer 10 over a portion of the printing surface 20 that has already been rendered in a print operation then the print head controller 30 inhibits firing of ink drops at that portion.

The user interface 18 may be implemented as a set of buttons and lights. The user interface 18 may alternatively be implemented with more capable visual displays.

Figure 2A:
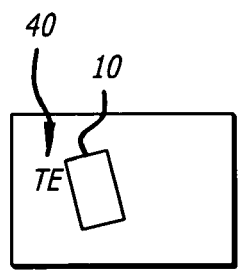
FIGS. 2a-2c illustrate the printing of an image onto a printing surface in response to user motion across the printing surface.
Figure 2B:
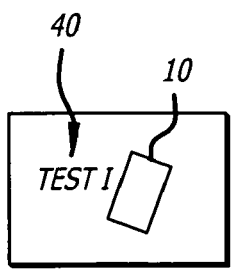
Figure 2C:
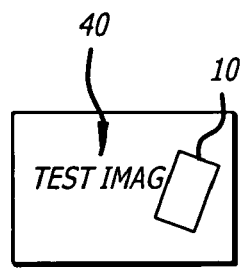

FIGS. 2a-2c illustrate the printing of an image 40 defined in the image buffer 16 onto the printing surface 20 in response to user movement of the handheld printer 10 across the printing surface 20. The handheld printer 10 appears to the user to function as a magic paintbrush that seems to know where on the printing surface 20 to print the image 40 including where to eject ink drops needed for the image 40 and where not to eject ink drops according to the image 40 and what portions of the image 40 have already been printed. The user may visually observe the completed and incomplete portions of the image 40 and then adjust their hand movements appropriately to complete the image 40 without worrying about reprinting areas of the image 40 with excessive amounts of ink.

The printing surface 20 may be any surface capable of being printed upon using ink drops ejected from the print head 12. The printing surface 20 may be a paper material or other substance. The printing surface 20 may have any form, e.g. a sheet, a wall, a table, a poster, a curved surface, etc., given that it is not subject to the constraints of a positioning mechanism as are the print media of prior art printers.

The handheld printer 10 may be implemented in a smaller form factor in comparison to prior portable printers because it does not include a positioning mechanism for controlling the relative positions of a print head and paper as is found in prior art printers. The form factor of the handheld printer 10 may provide an ease of portability that enables printing almost anywhere. For example, the handheld printer 10 may fit into a pocket, carried on an airplane, etc. The handheld printer 10 may also improves reliability due to the absence of moving parts.

Figure 3:
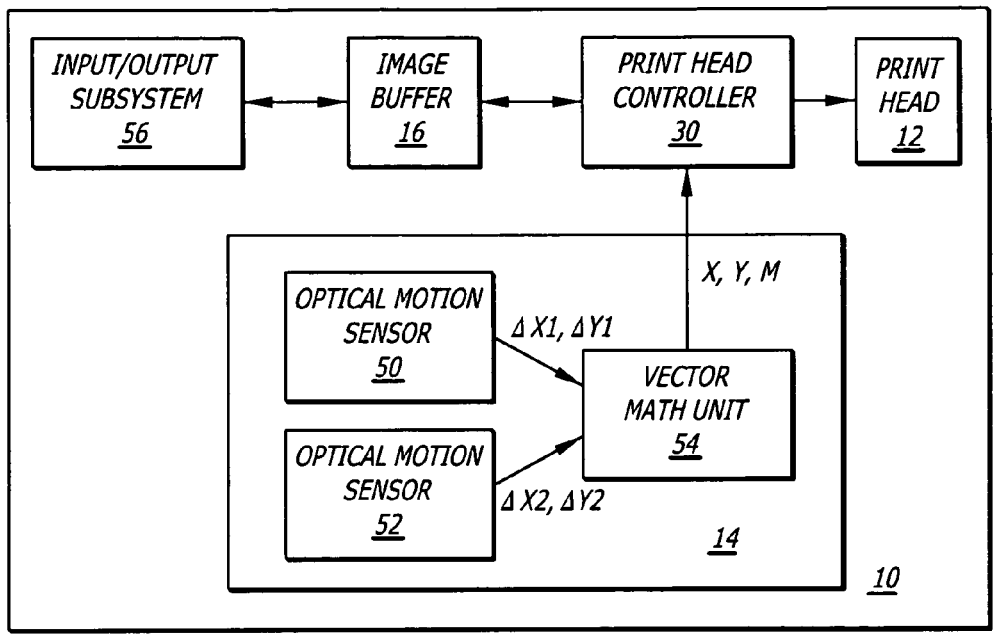
FIG. 3 illustrates a navigation subsystem in a handheld printer in one embodiment.

FIG. 3 illustrates the navigation subsystem 14 in the handheld printer 10 in one embodiment. The navigation subsystem 14 includes a pair of optical motion sensors 50 and 52 and a vector math unit 54. Also shown is an input/output subsystem 56 that enables transfer of an image to be printed into the image buffer 16.

The optical motion sensors 50 and 52 each include a digital camera for obtaining digital pictures of the printing surface 20 at a high frame rate and in one embodiment at a low resolution. The optical motion sensors 50 and 52 each include logic for determining $\Delta x$ and $\Delta y$ parameters in response to the corresponding obtained digital pictures using know techniques. The optical motion sensor 50 generates $\Delta x1$ and $\Delta y1$ values that indicate a movement of the optical motion sensor 50 over the printing surface 20 from the point of view of an optical sensor in the optical motion sensor 50. The optical motion sensor 52 generates $\Delta x2$ and $\Delta y2$ values that indicate a movement of the optical motion sensor 52 over the printing surface 20 from the point of view of an optical sensor in the optical motion sensor 52. The two optical motion sensors 50 and 52 enable the vector math unit 54 to determine rotational motion of the handheld printer 10 as well as overall motion of the handheld printer 10 in response to the $\Delta x1$ and $\Delta y1$ and $\Delta x2$ and $\Delta y2$ values.

The vector math unit 54 determines a set of current position coordinates x and y and a motion vector M in response to the $\Delta x1$ and $\Delta y1$ and $\Delta x2$ and $\Delta y2$ values and a set of starting position coordinates x0 and y0 using known techniques. The motion vector M indicates the speed and direction of movement of the handheld printer 10 with respect to the printing surface 20 at its current position x,y. The print head controller 30 obtains the current position coordinates x, y and the motion vector M from the navigation subsystem 14 and uses the information in conjunction with the contents of the image buffer 16 to determine whether to fire ink drops from the print head 12.

If the motion vector M indicates that a motion defined by the motion vector M from the current position x,y will cause a nozzle in the print head 12 to be in a position with respect to the printing surface 20 that corresponds to an area of the image 40 that requires ink for rendering, e.g. a dark or colored or opaque area, then the print head controller 30 causes that nozzle to fire ink drops at the printing surface 20. The amount of ink fired at the opaque area may depend on a pixel value in the image 40 that corresponds to the opaque area.

If the motion vector M indicates that a motion defined by the motion vector M from the current position x,y will cause a nozzle in the print head 12 to be in a position with respect to the printing surface 20 that corresponds to an area of the image 40 that does not require ink for rendering, e.g. a light or non-colored or non-opaque area, the print head controller 30 does not cause that nozzle to fire ink drops at the printing surface 20.

If the motion vector M indicates that a motion defined by the motion vector M from the current position x,y will cause a nozzle in the print head 12 to be in a position with respect to the printing surface 20 that corresponds to an area of the image 40 that requires ink for rendering but that has already been printed in a current print operation then the print head controller 30 does not cause that nozzle to fire ink drops at the printing surface 20.

The input/output subsystem 56 provides a mechanism for transferring the image 40 into the image buffer 16. The input/output subsystem 56 may provide a wire based or wireless connection to a computer system, a handheld device, or a digital camera, etc.

Figure 4:
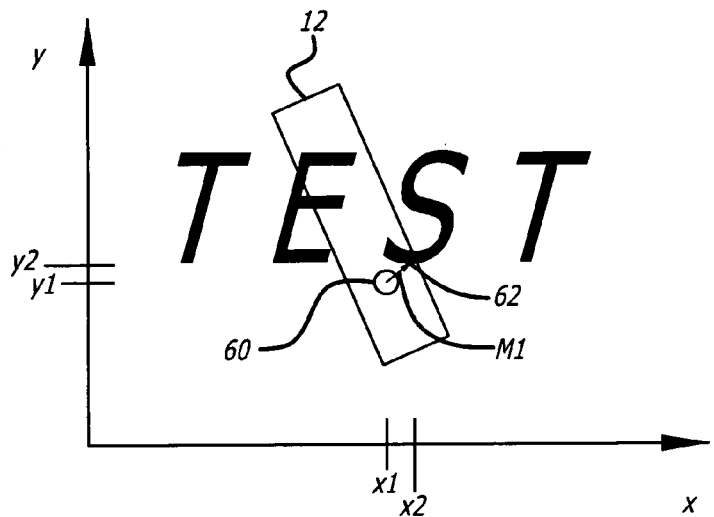
FIG. 4 shows a nozzle in a print head during a print operation.

FIG. 4 shows a nozzle 60 in the print head 12 during a print operation of the image 40 onto the printing surface 20. The printing surface 20 corresponds to an X-Y coordinate system. The X-Y coordinate system is used in the handheld printer 10 for position and motion calculations, etc., and is not part of the printing surface 20. The current position of the nozzle 60 is x1, y1 and the motion vector at the current position is M1.

The current position of the nozzle 60 of x1, y1 and the corresponding motion vector M1 indicate that the nozzle 60 is heading to an area 62 of the image 40 and will arrive over the area 62 at x2, y2 after a time interval of $\Delta t$. The area 62 corresponds to a pixel value in the image 40 that requires ink to be applied to the area 62. As a consequence, the print head controller 30 causes the print head 12 to fire the nozzle 60 when the nozzle 60 reaches the area 62 in accordance with the pixel value for the area 62 unless the area 62 has already been rendered.

In one embodiment, the print head controller 30 determines an address into the image buffer 16 using the current position x1, y1 and the motion vector M1. The determined address is an address to a portion of the image buffer 16 that corresponds to an area in the X-Y coordinate system that is defined by the motion vector M1 from the current position x1, y1, and the time interval $\Delta t$. The determined address is applied to the image buffer 16 by the print head controller 30 which causes it to read out a pixel value that is associated with the area 62 of the image 40. If the pixel value read out of the image buffer 16 is not equal to zero it causes the print head controller 30 to fire the nozzle 60 and if the pixel value is equal to zero then the print head controller 30 does not fire the nozzle 60. The print head controller 30 then clears the pixel from the image buffer 16 at the determined address so that a subsequent pass of the nozzle 60 over the area 62 does not cause the print head controller to fire the nozzle 60.

The time interval $\Delta t$ may be a tunable parameter that depends on the speed at which the print head controller 12 can cause a firing of an ink drop from the nozzle 60.

In one embodiment, the print head 12 includes multiple nozzles and the vector math unit 54 or the print head controller 30 determines a current position for each nozzle in response the position of each nozzle on the print head 12. This enables the print head controller 30 to obtain information from the image buffer 16 for each nozzle using the motion vector M1.

Figure 5:
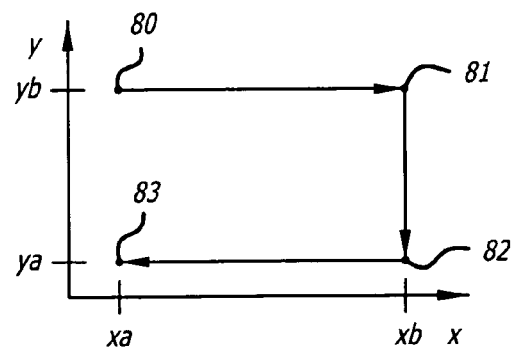
FIG. 5 shows a method for starting a print operation using a handheld printer according to the present teachings.

FIG. 5 shows a method for starting a print operation using the handheld printer 10 according to the present teachings. The method shown enables a user to specify a set of boundaries for rendering the image 40. A user begins the print operation by positioning the handheld printer 10 at a position 80 on the printing surface 20 and then engaging a function of the user interface 18. The user then employs a steady motion to the right (in a positive X direction) to move the handheld printer 10 to a position 81 and again engages a function of the user interface 18. The user repeats this process moving down (a negative Y direction) to a position 82 and engaging the a function of the user interface 18 and then moving left (a negative X direction) and engaging a function of the user interface 18.

The print head controller 30 internally stores the coordinates xa, yb and xb, yb and xb, ya and xa, ya of the positions 80-83, respectively. The coordinates define the boundaries of a printing area of the printing surface 20 and the print head controller 30 scales the image 40 to the specified boundaries. The user then prints of the image 40 by engaging a function of the user interface 18 at the position 83 (the starting coordinates x0, y0) and by using any subsequent motion over the printing surface 20. The handheld printer 10 tracks the movements from the position 83 and prints the image 40 while scaling the image 40 to the specified boundaries.

The example sequence of defining the position 80 then the position 81, then the position 82, and then the 83 for a printing boundary is only one example sequence. Any sequence may be used.

The positions 80-83 define a print area box. The handheld printer 10 auto-adjusts the positions 80-83 to define a rectangular print area box given that a user is unlikely to draw a perfectly rectangular box. The handheld printer 10 may adjust the print area box to a nearest standard size, e.g. 8 ½"×11" or 3"×5", etc. The handheld printer 10 intelligently scales the image 40 to the print area box based on a variety of factors such as input file type, quantity of scaling required, etc. A user may select from among these scaling factors via the user interface 18. Alternatively, the choices among these scaling factors may be contained in an file obtained from a host computer, e.g. a user on the host computer may select the scaling factors.

If a user does not desire to scale the image 40 then a print operation may begin at any predetermined starting position with respect to a bit map that defines the image 40. Example predetermined starting positions for printing the image 40 include a top-left position of the printing area of the image 40, a top-right position of the printing area of the image 40, a bottom-left position of the printing area of the image 40, a bottom-right position of the printing area of the image 40, and the center of the printing area of the image 40. For example, the user may position the handheld printer 10 at a position on the printing surface 20 that will correspond to the center of the printing area for the image 40 and then engage printing using the user interface 18 and then use any motion over the printing surface 20 while printing the image 40.

Figure 6:
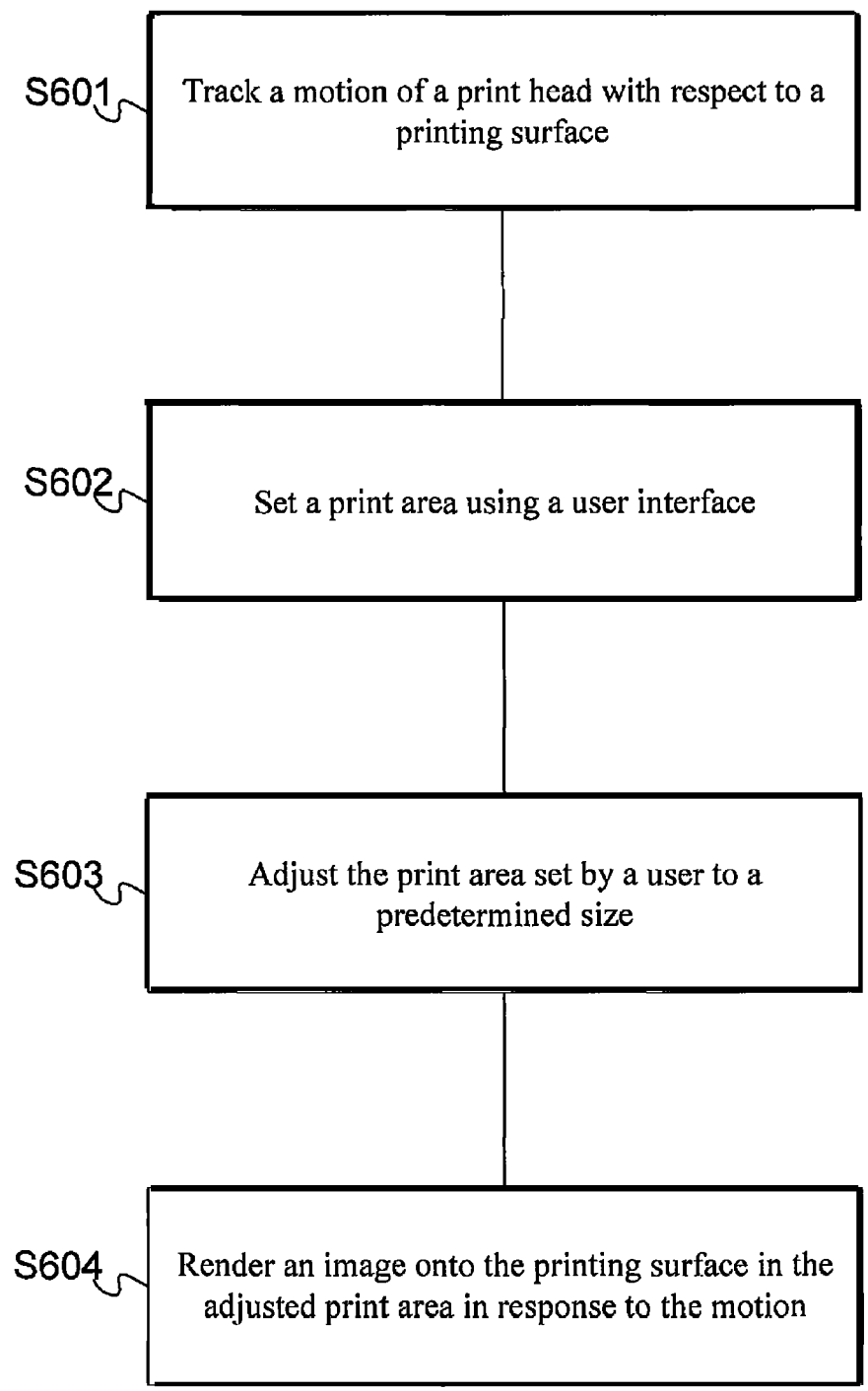
FIG. 6 shows a method for printing according to the present teachings.

FIG. 6 shows a method for printing, which includes, at S601, tracking a motion of a print head with respect to a printing surface, at S602, setting a print area using a user interface, at S603, adjusting the print area set by a user to a predetermined size and, at S604, rendering an image onto the printing surface in the adjusted print area in response to the motion.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A handheld printer, comprising:
   a navigation subsystem that tracks a motion of the handheld printer with respect to a printing surface;
   a print head controller that causes a print head to render an image onto the printing surface in response to the motion; and
   a user interface that enables a user to specify a set of boundaries for setting a print area;
   wherein the print head controller is configured to adjust the print area set by the user to a predetermined size selected based on the set of boundaries;
   wherein the print head controller is configured to scale the image to the predetermined size for printing the image in the adjusted print area.

2. The handheld printer of claim 1, wherein the print head controller causes the print head to render the image onto the printing surface in response to information stored in an image buffer.

3. The handheld printer of claim 2, wherein the print head controller determines whether to render the image in response to a pixel in the image buffer.

4. The handheld printer of claim 3, wherein the print head controller determines whether to render the image in response to an indication of whether the pixel has already been printed.

5. The handheld printer of claim 1, further comprising an image buffer for storing the image.

6. The handheld printer of claim 1, wherein the print head controller selects the predetermined size nearest to the boundaries.

7. The handheld printer of claim 3, wherein the user interface enables the user to specify a starting position for rendering the image.

8. The handheld printer of claim 5, further comprising an input/output subsystem that enables transfer of the image into the image buffer.

9. The handheld printer of claim 1, wherein the navigation subsystem includes one or more optical motion sensors.

10. The handheld printer of claim 1, wherein the print head controller is configured to access an image buffer using a current position of the handheld printer and a time interval, wherein the time interval is adjustable.

11. The handheld printer of claim 1, wherein the print head controller is configured to select one of a plurality of predetermined sizes and to adjust the print area to the selected predetermined size.

12. The handheld printer of claim 11, wherein the plurality of predetermined sizes comprises a plurality of standard sizes; and
   wherein the print head controller selects the predetermined size from the plurality of standard sizes that is nearest the print area set by the user.

13. The handheld printer of claim 12, wherein the predetermined size is 8.5 inches by 11 inches or 3 inches by 5 inches.

14. A method for printing, comprising:
   tracking a motion of a print head with respect to a printing surface;
   setting a print area based on a set of boundaries received via a user interface of a handheld printer;
   adjusting, with a print head controller, the print area set by the user interface to a predetermined size selected based on the set of boundaries;
   scaling an image to the predetermined size; and
   rendering the image onto the printing surface in the adjusted print area in response to the motion.

15. The method of claim 14, wherein rendering the image comprises firing ink drops in response to information stored in an image buffer.

16. The method of claim 15, wherein firing the ink drops comprises firing in response to a pixels in the image buffer.

17. The method of claim 16, wherein firing the ink drops comprises firing the ink drops in response to an indication of whether the pixel has already been printed.

18. The method of claim 15, wherein firing the ink drops comprises firing in response to the image in the image buffer.

19. The method of claim 14, wherein the predetermined size is a standard size nearest to the set of boundaries.

20. The method of claim 14, wherein setting the print area further comprises specifying a starting position for rendering the image.

21. The method of claim 14, further comprising transferring the image into the image buffer.

22. The method of claim 14, wherein tracking comprises tracking using one or more optical motion sensors.

23. The method of claim 15, further comprising:
adjusting a timer interval for accessing the image buffer based on a current position of the print head according to a firing speed of the print head.

24. The method of claim 14, wherein the predetermined size is selected from a plurality of standard sizes as the standard size from the plurality of standard sizes that is nearest the set of boundaries received via the user interface.

* * * * *